Jan. 18, 1944. P. V. SITTERT ET AL 2,339,531
NUT SETTER
Filed Dec. 12, 1941 2 Sheets-Sheet 1
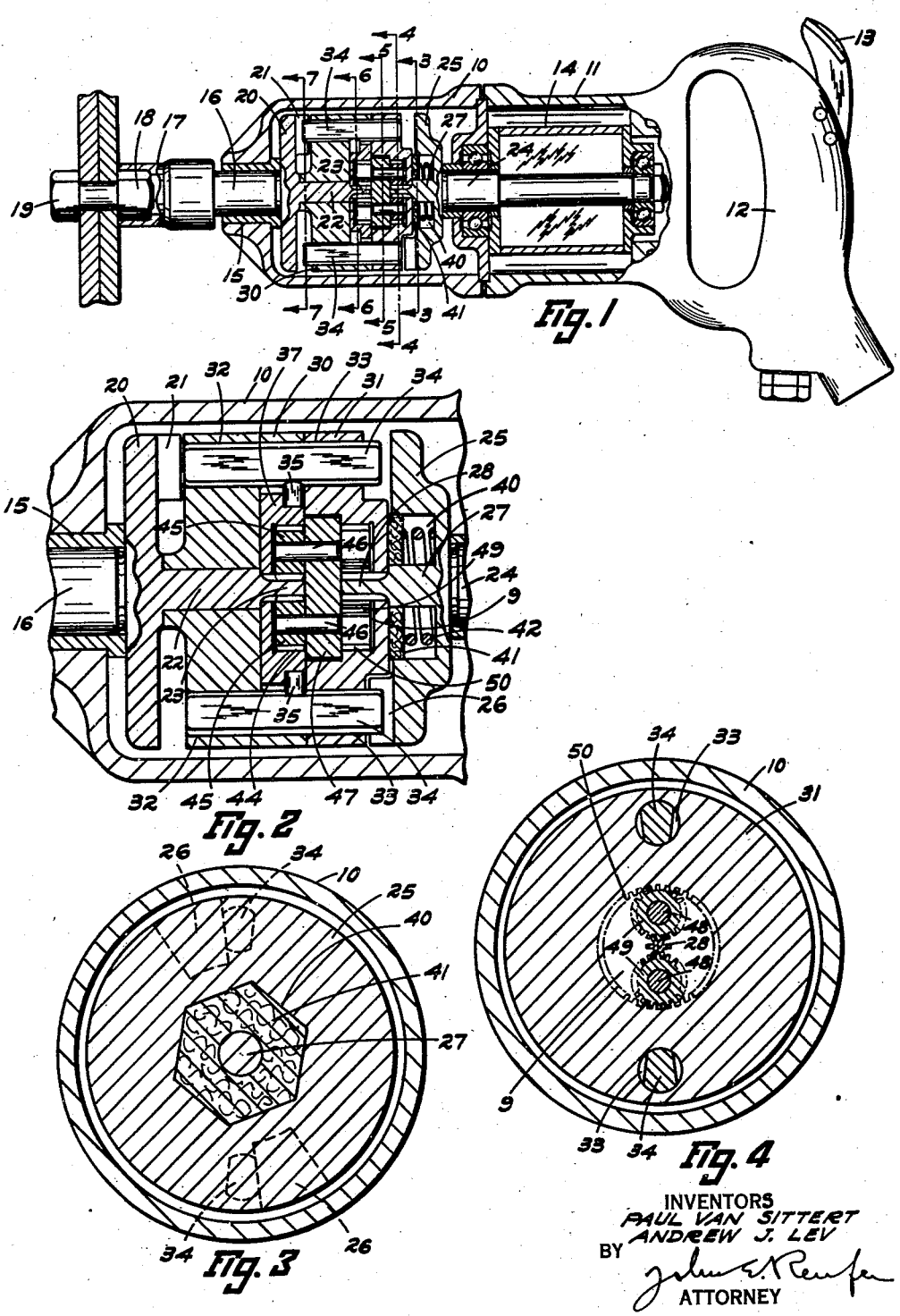
INVENTORS
PAUL VAN SITTERT
ANDREW J. LEV
BY
ATTORNEY Jan. 18, 1944.   P. V. SITTERT ET AL   2,339,531
NUT SETTER
Filed Dec. 12, 1941   2 Sheets-Sheet 2

INVENTORS
PAUL VAN SITTERT
ANDREW J. LEV
BY
ATTORNEY

Patented Jan. 18, 1944

2,339,531

UNITED STATES PATENT OFFICE 2,339,531

NUT SETTER

Paul Van Sittert, Shaker Heights, and Andrew J. Lev, Garfield Heights, Ohio, assignors to The Cleveland Pneumatic Tool Company, Cleveland, Ohio, a corporation of Ohio Application December 12, 1941, Serial No. 422,710

15 Claims. (Cl. 192—30.5)

This invention relates to nut setters, that is to say power tools for turning down and tightening nuts or the like. More particularly the invention covers a tool of this character which operates by intermittent impact after the resistance to rotation of the driven member reaches a predetermined value.

One of the objects of the invention is the provision of a tool of greater effectiveness for a given power imput.

Another object of the invention is the provision of a tool in which impacts are transmitted to the work from a flywheel which has no positive connection with the motor at the times when the impacts are imparted.

Another object of the invention is the provision of means for automatically imparting recurring impulses to a flywheel and transmitting those impulses to a driven member.

A further object is the provision of novel means for clutching a flywheel to the driving and driven members alternately in rapid sequence.

Other objects and features of novelty will appear as we proceed with the description of that embodiment of the invention which, for the purposes of the present application, we have illustrated in the accompanying drawings, in which Fig. 1 is an elevational view, partly in longitudinal central section, of a power tool embodying the invention.

Fig. 2 is a fragmentary view in central section on a larger scale showing the flywheel and the means for clutching it to the driver and to the driven member alternately.

Figs. 3, 4, 5, 6 and 7 are transverse sectional views on the same scale as Fig. 2, the sections being taken substantially on the lines 3—3, 4—4, 5—5, 6—6, and 7—7 of Fig. 1.

Figure 5:
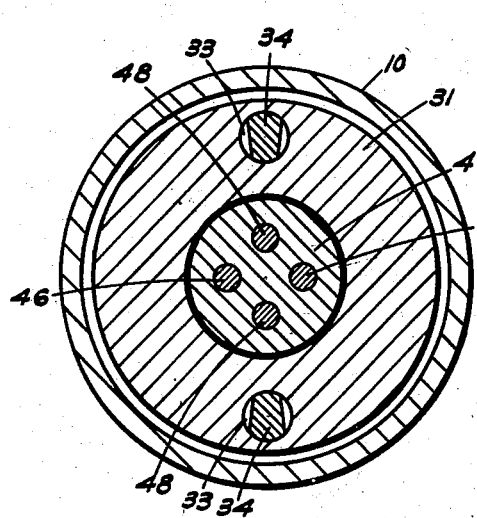
Figure 6:
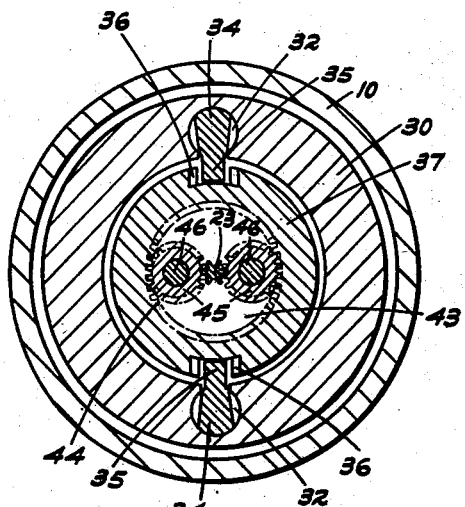
Figure 7:
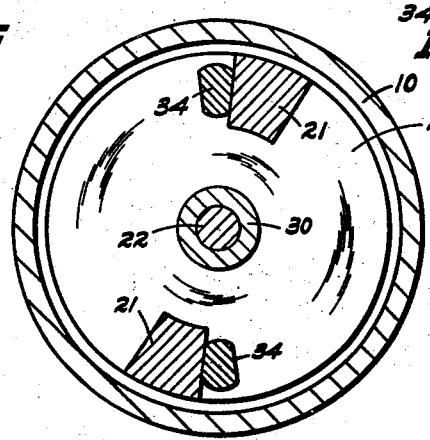
Figure 8:
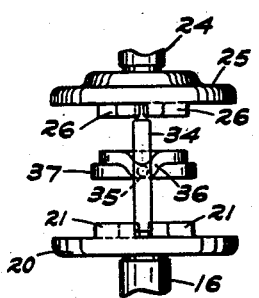
Figure 9:
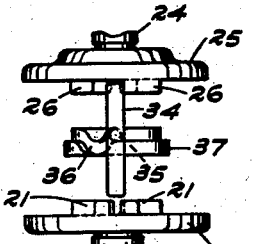
Figure 10:

Figs. 8 and 9 are diagrammatic views illustrating one of the clutch bars in its two different operative positions, and Fig. 10 is a developed view of the rotary cam by means of which the clutch members are shifted.

Referring first to Fig. 1 of the drawings, 10 and 11 are parts of a housing for a power tool which may have a hand grip 12 and a control lever 13. The motor of the tool, which is preferably a compressed air motor but may be electric if desired, is indicated generally at 14. Located in the housing part 10 coaxial with the motor 14 there is a bearing 15 in which is mounted a shaft 16 that carries a socket wrench 17 shown in position to drive a nut 18 on a bolt 19.

Shaft 16 carries what may be termed a clutch plate 20 provided with diametrically opposed clutch dogs 21, and beyond this plate the shaft has a reduced diameter portion 22 in the end of which a pinion 23 is cut. The shaft 24 of motor 14 also carries a clutch plate 25 provided with diametrically opposed clutch dogs 26. Shaft 24 also has a reduced diameter portion 27 with a pinion 28 cut in the end thereof.

Between the clutch plates 20 and 25 there is a floating flywheel which for convenience in assembly is made of two parts 30 and 31. Registering holes 32 and 33 are formed in parts 30 and 31 at diametrically opposed points, and in these registering holes are mounted clutch bars 34, which are freely slidable lengthwise. These bars are of a length to project beyond either end of the flywheel for engagement alternately with the clutch dogs 21 or 26.

Each bar 34 is provided with a tongue 35 which projects radially inward and engages with a groove 36 formed in the periphery of a rotatable cam 37. The cam groove 36 has two diametrically opposed low spots 38, see particularly Fig. 10, which guide the tongues 35 into position to shift bars 34 to the left as viewed in Figs. 1 and 2, bringing bars 34 into position to engage clutch dogs 21. At other times the tongue and cam groove serve to hold the clutch bars 34 in position to engage clutch dogs 26.

Clutch plate 25 has a polygonal cavity 40 therein surrounding the small shaft 27, and in this cavity there is a polygonal friction plate 41 backed by a coil spring 42. The plate 41 bears against the flywheel part 31 and tends to turn the flywheel at motor speed.

Annular cam 37 which is accommodated in a pocket in one face of flywheel part 30 is itself provided with a circular pocket 43 in the peripheral wall of which teeth are cut to form an internal gear 44. Between this gear and the pinion 23 are small gears 45 which mesh with both the internal gear and the pinion. These small gears 45 rotate upon pins 46 which are fixed in a carrier 47 of circular disk form that is situated in the larger part of a stepped cavity 9 in the flywheel part 31, this carrier being located between pinions 23 and 28.

Carrier 47 also has mounted therein two pins 48 spaced 90° from the pins 46 and extending in the opposite direction from those pins. The pins 48 rotatably receive small gears 49 which mesh with pinion 28 and also with an internal gear 50 the teeth of which are cut in the peripheral wall of the smaller part of the stepped cavity 9.

*Operation.*—When a nut 18 is to be set, the operator places the socket wrench 19 over the nut as illustrated in Fig. 1 and actuates control lever 13 to start the motor 14. Assuming that the clutch bars 34 are in the position of Fig. 1, the flywheel will then be driven through the friction plate 41 and the clutch bars 34 will engage the clutch dogs 21 and turn the plate 20 and the shaft 16, the carrier 47 with its gears 45 and 49 and the cam 37 all turning together with the flywheel and the two shafts 22 and 27. If when the power is turned on the clutch bars 34 happen to be in the position of Fig. 2 the flywheel will then turn freely momentarily, but since the pinion 23 will then be stationary and since the carrier 47 will be rotated by the flywheel, that is through the revolving gears 49, gears 45 will be revolved about pinion 23 and will cause rotation of internal gear 44 which is a part of cam member 37. The rotation of the cam member will shift the clutch bars 34 into position to engage clutch dogs 21, whereupon all parts will turn together.

As soon as the nut begins to tighten on the bolt the load which it imposes upon the tool will cause the friction disk 41 to slip upon the surface of flywheel part 31, the flywheel and the driveen shaft 22—16 standing still. From this point on the tool operates as a rotary impact tool. Now with the internal gear 50 stationary rotation of driver pinion 28 by the motor will turn the small gears 49, causing them to run upon the internal gear 50, thereby rotating the carrier member 47. The carrier member thereby revolves the small gears 45 upon the then stationary pinion 23, which transmits motion to the internal gear 44, revolving the cam member 37 sufficiently to move the tongues 35 out of the low spots 38 of the cam, where they are shown in Fig. 8 to the relatively long high spots as illustrated in Fig. 9. The clutch bars 34 are thereby shifted into position to be engaged by the clutch dogs 26 on the plate 25, as illustrated in Fig. 3. The flywheel is thereby freed from the load and given a rotary impulse from the motor. Carrier 47 is then again rotated and the small gears 45 are caused to run upon the internal gear 44, turning the cam member at a rate of speed determined by the gear ratio between the pinion 28 and the cam member 47. In practice, this ratio is calculated to be about three to one, that is the flywheel is calculated to run about three times faster than the cam member 47. Therefore when the flywheel is released from its load, that is from the clutch plate 20, it is free to gain momentum under the impetus of the motor and to rotate for one and a half revolutions. Concurrently the cam 38 will rotate one-half of a revolution and immediately thereafter will cause the tongues 35 to again enter the low spots 38 of the cam for shifting the clutch bars 34 into position to engage the driven member. When this occurs the flywheel, now under maximum motor speed, imparts its stored up energy to the driven member, thereby delivering a strong rotary impact to the nut 18. The flywheel is then again stationary and the pinion 28 causes small gears 49 to run upon internal gear 50, thereby rotating carrier 47 which functions through small gears 45 to turn the cam 37 and shift the clutch bars 34, freeing the flywheel from the driven member and bringing clutch bars 34 into position to be engaged by clutch dogs 26, so that a new impulse may be imparted to the flywheel and the cycle of operations repeated.

It will be observed that in the mechanism described the motor is connected with the driven member only while the load is light, that is at the beginning of the nut setting operation. After the load becomes heavy the motor is used only to impart rotation to the floating flywheel, and the latter delivers its impacts to the nut only at times when the flywheel and motor are disconnected. The motor therefore is relieved from the impact shocks and its life consequently increased. Furthermore after the clutch bars 34 are shifted out of engagement with the driven member and into position to be engaged by the driving member the shock of engagement of the driver with the flywheel is lessened owing to the fact that the flywheel is caused to accelerate somewhat through the friction drive before the metal to metal connection is made.

Variations from the described structure may be employed. Accordingly we desire it to be understood that the scope of the invention is to be regarded as defined exclusively by the appended claims rather than by the foregoing description or the accompanying illustration.

Having thus described our invention, we claim:

1. In a nut setter, a driver, a floating flywheel, a driven member, a clutch member movable with the flywheel for connecting the latter either to the driver or to the driven member, a shifter for said clutch member, means affording relative rotation between said driver and driven member, and means functioning during the rotation of the flywheel and responsive to relative rotation of said driving and driven members for actuating said shifter to cause said clutch member to disengage the flywheel from the driver and connect it to the driven member.

2. In a nut setter, a driver, a floating flywheel, a driven member, a clutch member movable with the flywheel for connecting the latter either to the driver or to the driven member, said driver and driven member being mounted for relative rotation, a shifter for said clutch member, and means dependent upon flywheel rotation and responsive to relative rotation of said driving and driven members for actuating said shifter to cause said clutch member to disengage the flywheel from the driver and connect it to the driven member.

3. In a nut setter, a driver, a floating flywheel, a driven member, a clutch member movable with the flywheel for connecting the latter either to the driver or to the driven member, a shifter for said clutch member, and means dependent upon driver rotation while the driven member and flywheel are stationary for actuating said shifter to cause said clutch member to disengage the driven member from the flywheel and to connect the latter to the driver.

4. In a nut setter, a driver, a floating flywheel, a driven member coaxial with the driver and flywheel, a clutch member mounted on the flywheel shiftable to clutch together the driver and flywheel or the flywheel and driven member alternately, means comprising a rotary cam for shifting said clutch member, and means functioning in response to relative rotation between the driver and driven member for turning said cam to effect shifting of the said clutch member.

5. In a nut setter, a driver, a floating flywheel, a driven member coaxial with the driver and flywheel, a clutch bar parallel to the axis of rotation of the driver, flywheel and driven member, said clutch bar being shiftable lengthwise to clutch together the driver and flywheel or the flywheel and driven member alternately, a rotary cam for shifting said clutch bar, and means functioning in response to relative rotation between the driver and driven member for turning said cam to effect shifting of the said clutch bar.

6. In a nut setter, a driver, a floating flywheel, a driven member, a friction connection between the driver and flywheel, a clutch member carried by the flywheel adapted to connect the flywheel to the driver or the driven member alternately, said friction connection being adapted to transmit rotation from the driver through the flywheel to the driven member until resistance to rotation of the driven member reaches a predetermined value, and means dependent upon relative rotation of said driver and driven member thereafter for shifting said clutch member to connect the flywheel alternately with the driver and driven members and to thereby impart rotary impulses to the driven member from the flywheel while the latter is disconnected from the driver.

7. In a nut setter, a driver, a floating flywheel, a driven member, means for clutching together the driver and flywheel or the driven member and flywheel alternately, means comprising a rotatable cam for shifting said clutching means from one operative position to the other, and gearing connections operated by relative rotation of the driving and driven members for rotating the cam relatively to the flywheel.

8. In a nut setter, a driver, a flywheel, a driven member, means for clutching together the driver and flywheel or the driven member and flywheel alternately, means comprising a rotatable cam for shifting said clutching means from one operative position to the other, and gear connections operated by relative rotation of the driving and driven members for rotating said cam intermittently relatively to said flywheel.

9. In a nut setter, a driver, a floating flywheel, a driven member, clutch means for imparting rotary impulses from the driver to the flywheel, a shifter for said clutch means, means affording relative rotation between said driver and said driven member, and means functioning automatically during the rotation of the flywheel and responsive to relative rotation of said driving and driven members for operating said shifter and thereby releasing said flywheel from positive connection with the driver and thereafter connecting it to the driven member.

10. In a nut setter, a driver, a floating flywheel, a driven member, clutch means for imparting a rotary impulse from the driver to the flywheel, a shifter for said clutch means, means affording relative rotation between said driver and said driven member, and means dependent upon flywheel rotation and responsive to relative rotation of said driving and driven members for operating said shifter and thereby releasing the flywheel from a positive connection with the driver and thereafter connecting said flywheel and driven member.

11. In a nut setter, a driver, a floating flywheel, a driven member, means for clutching together the driver and flywheel or the driven member and flywheel alternately, a rotatable cam carried by said flywheel and mounted internally thereof for shifting said clutching means from one operative position to the other, and means functioning in response to relative rotation between the driver and the driven member for turning said cam to effect shifting of said clutch means.

12. In a nut setter, a driver, a floating flywheel, a driven member, means for clutching together the driver and flywheel or the driven member and flywheel alternately, means for shifting said clutching means from one operative position to the other, and means operated by relative rotation of the driving and driven member for operating said shifting means intermittently relatively to said flywheel.

13. In a nut setter, a driver, a floating flywheel, a driven member, means for clutching together the driver and flywheel of the driven member and flywheel alternately, means affording relative rotation between said driver and driven members, a rotatable cam carried by said flywheel, means on said clutch means having engagement with said cam for shifting said clutch means from one operative position to the other, and means functioning in response to relative rotation between the driver and driven members for rotating said cam to effect shifting of said clutch means.

14. In a nut setter, a driver, a floating flywheel, a driven member, means for clutching together the driver and flywheel or the driven member and flywheel alternately, means affording relative rotation between said driver and driven members, a rotatable cam carried by said flywheel, means on said clutch means having engagement with said cam for shifting said clutch means from one operative position to the other, and gearing connections operated by relative rotation of the driving and driven members for rotating the cam to effect shifting of said clutch means.

15. In a nut setter, a driver, a floating flywheel, a driven member, means for clutching together the driver and flywheel or the driven member and flywheel alternately, means affording relative rotation between said driver and driven members, a rotatable cam carried by said flywheel, means on said clutch means having engagement with said cam for shifting said clutch means from one operative position to the other, and gearing connections mounted internally of said flywheel and operated by relative rotation of the driving and driven members for rotating the cam to effect shifting of said clutch means.

PAUL VAN SITTERT.
ANDREW J. LEV.